United States Patent [19]

Markous

[11] Patent Number: 5,018,261

[45] Date of Patent: May 28, 1991

[54] PISTON PUSHING TOOL

[76] Inventor: Ezaria Y. Markous, 119 S. Laurel, Royal Oak, Mich. 48067

[21] Appl. No.: 507,603

[22] Filed: Apr. 10, 1990

[51] Int. Cl.[5] .............................................. B23P 19/04

[52] U.S. Cl. .......................................... 29/239; 29/266

[58] Field of Search ................. 29/239, 266, 256, 258, 29/263, 269, 233; 254/100, 101; 269/249

[56] References Cited

U.S. PATENT DOCUMENTS

| | | | |
|---|---|---|---|
| 2,592,420 | 4/1952 | Harrison . | |
| 2,859,456 | 11/1958 | Taylor . | |
| 3,055,093 | 9/1962 | Ruble . | |
| 3,786,551 | 1/1974 | Gregg et al. . | |
| 3,835,522 | 9/1974 | Ward | 29/239 |
| 4,009,515 | 3/1977 | Racin . | |
| 4,105,344 | 8/1978 | Rovsom | 269/249 |
| 4,694,569 | 9/1987 | Colvell et al. . | |
| 4,903,391 | 2/1990 | Franks | 29/266 |

*Primary Examiner*—Robert C. Watson
*Attorney, Agent, or Firm*—Basile and Hanlon

[57] ABSTRACT

A piston pushing tool is disclosed for use in disc brake assemblies having a caliper housing. The housing provides a piston receiving bore in which a piston is reciprocably disposed, with the bore being open at one end and closed at its opposite end. An outboard shoe support bracket is spaced axially apart from the open end and has axially outer and inner surfaces and an opening therethrough generally aligned with the bore. The piston is a hollow cylindrical piston with the first end adjacent the closed end of the bore, and a second end adjacent the open end of the bore. The tool comprises a threaded shaft having a distal end, a proximal end, and an intermediate portion, with the shaft being proportioned and designed to extend axially through the opening in the support bracket. A handle is attached to the proximal end of the shaft for rotating the shaft. A first plate is engaged on the intermediate portion of the shaft for abutting the axially inner surface of the support bracket, while a second plate is engaged on the distal end of the shaft for abutting the second end of the piston. Upon rotation of the handle, the second plate is driven away from the first plate, thereby pushing the piston fully into the piston receiving bore.

4 Claims, 2 Drawing Sheets

PISTON PUSHING TOOL

BACKGROUND OF THE INVENTION

1. Field of the Invention

The present invention relates generally to brake caliper tools, and more particularly to a piston pushing tool for use in disc brake assemblies having a caliper housing.

2. Description of the Relevant Art

In the past, numerous tools have been proposed for pushing or pulling pistons contained within disc brake assemblies. Most of these are quite complex, and all have sevaral problems inherent in them.

One such tool is described in U.S. Pat. No. 3,786,551 issued to Gregg. That tool has rubber like grommet on one end of a threaded shaft. A moveable abutment axially compresses the grommet causing it to expand radially, thereby frictionally engaging the hollow interior of the piston. A problem with this device is that the grommet rotates with the threaded shaft, thereby causing unnecessary and unwanted rotation of the piston when the grommet engages the piston. Additionally, since this tool fits inside the piston, the piston can be pushed farther than is necessary, since the piston need only be flush with the piston receiving bore in order to service the disc brake assembly.

A problem with tools for use with closed ended pistons containing two peg receiving bores is that it is difficult to align the pegs on the tool within the peg receiving bores at the same time that the tool abutment member is positioned against the axial inner surface of the outboard shoe support bracket.

Thus, it would be desirable to provide a piston pushing tool of a relatively simple structure which will not rotate an open ended piston and will push the piston only until it is flush with the piston receiving bore. It would also be desirable to provide a tool for use in closed ended pistons which would allow alignment of the pegs within the peg receiving bores first and subsequent tightening an abutment member against the axial inner surface of the outboard shoe support bracket.

SUMMARY OF THE INVENTION

The present invention solves all the problems discussed above by providing a piston pushing tool for in disc brake assemblies having a caliper housing providing a piston receiving bore in which a piston is reciprocably disposed. The bore is open at one end and closed at its opposite end, and an outboard shoe support bracket is spaced axially apart from the open end. The support bracket has axially outer and inner surfaces and an opening therethrough generally aligned with the bore. The piston is a hollow cylindrical piston with a first end adjacent the closed end of the bore, and a second end adjacent the open end of the bore.

The tool comprises a threaded shaft having a distal end, a proximal end, and an intermediate portion. The shaft is proportioned and designed to extend axially through the opening in the support bracket.

Means are attached to the proximal end of the shaft for rotating the shaft. Means, engaged on the intermediate portion of the shaft, are provided for abutting the axially inner surface of the support bracket. The tool further comprises means, engaged on the distal end of the shaft, for abutting the second end of the piston. Upon rotation of the rotating means, the piston abutting means will be driven away from the axially inner surface abutting means, thereby pushing the piston fully into the piston receiving bore.

BRIEF DESCRIPTION OF THE DRAWINGS

Various features and modifications of the present invention will become apparent to those skilled in the art upon reference to the following specification and drawings, in which.

DESCRIPTION OF THE PREFERRED EMBODIMENT

Figure 1:
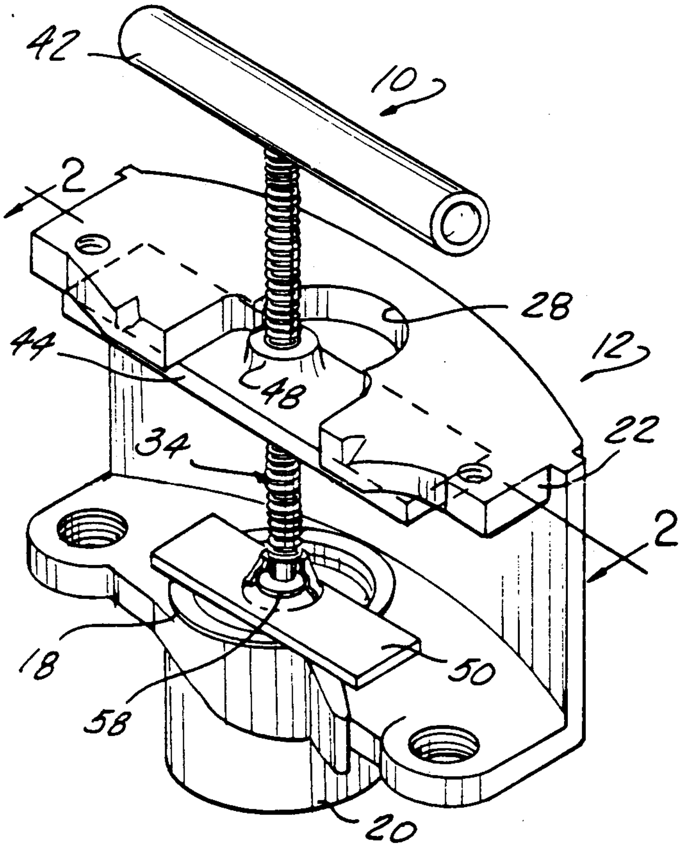
FIG. 1 is a perspective view of the first embodiment of the present invention, shown in use in a disc brake assembly, with the cylindrical foot partially cutaway showing showing the T-shaped section of the shaft.
Figure 2:
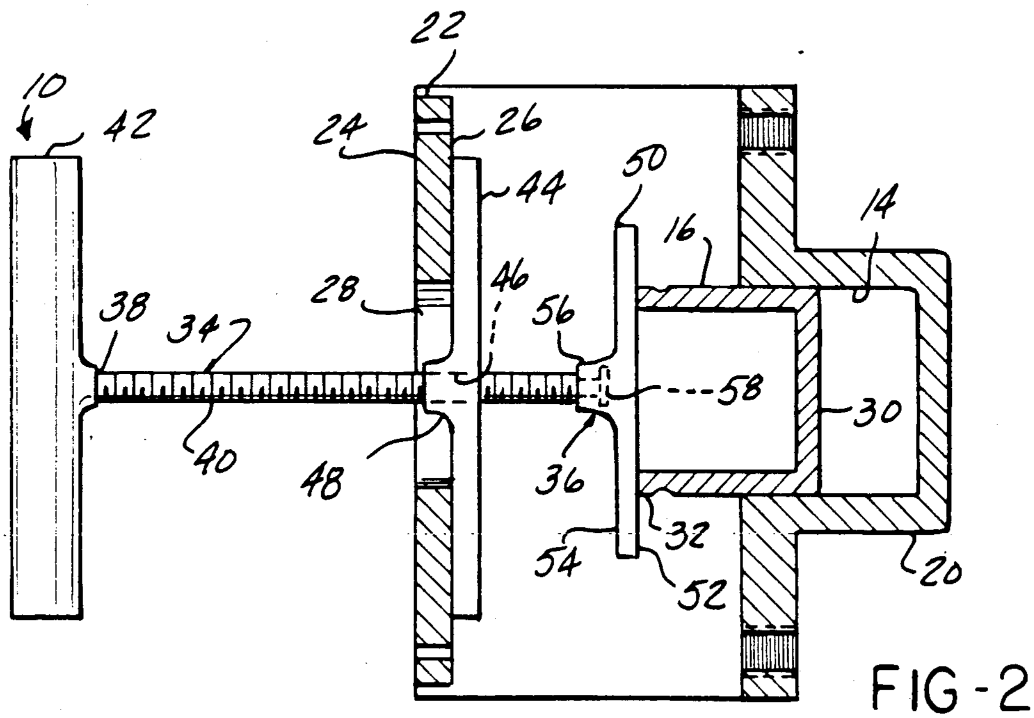
FIG. 2 is a cross sectional view taken along line 2—2 of FIG. 1, showing the piston partially out of the piston receiving bore.

Referring now to FIG. 1, the piston pushing tool of the present invention is designated generally as 10. Piston pushing tool 10 is adapted for use in disc brake assemblies having a caliper housing 12. Caliper housing 12 provides a piston receiving bore 14 in which a piston 16 is reciprocably disposed, as best seen in FIG. 2. Bore 14 is open at one end 18 and closed at its opposite end 20. An outboard shoe support bracket 22 is spaced axially apart from open end 18 and has axially outer and inner surfaces, 24, 26 respectively. An opening 28 extends through shoe support bracket 22, and is generally aligned with bore 14. Piston 16 is a hollow cylindrical piston with a first end 30 adjacent the closed end 20 of bore 14, and a second end 32 adjacent open end 18 of bore 14.

Tool 10 comprises a threaded shaft 34 having a distal end 36, a proximal end 38, and an intermediate portion 40. Shaft 34 is proportioned and designed to extend axially through opening 28 in support bracket 22.

Means, attached to proximal end 38 of shaft 34, are provided for rotating shaft 34. Means are provided, engaged on intermediate portion 40 of shaft 34, for abutting axially inner surface 26 of support bracket 22.

Means, engaged on distal end 36 of shaft 34 are provided abutting second end 32 of piston 16. Upon rotation of the rotating means, the piston abutting means will be driven away from the axially inner surface abutting means, thereby pushing piston 16 fully into the piston receiving bore 14.

The first embodiment of piston pushing tool 10 is for use with front disc brake caliper assemblies. In the first embodiment, second end 32 of piston 16 is open, and the piston abutting means is non rotational. In addition, the axially inner surface abutting means is threadingly engaged on intermediate shaft portion 40.

Figure 3:
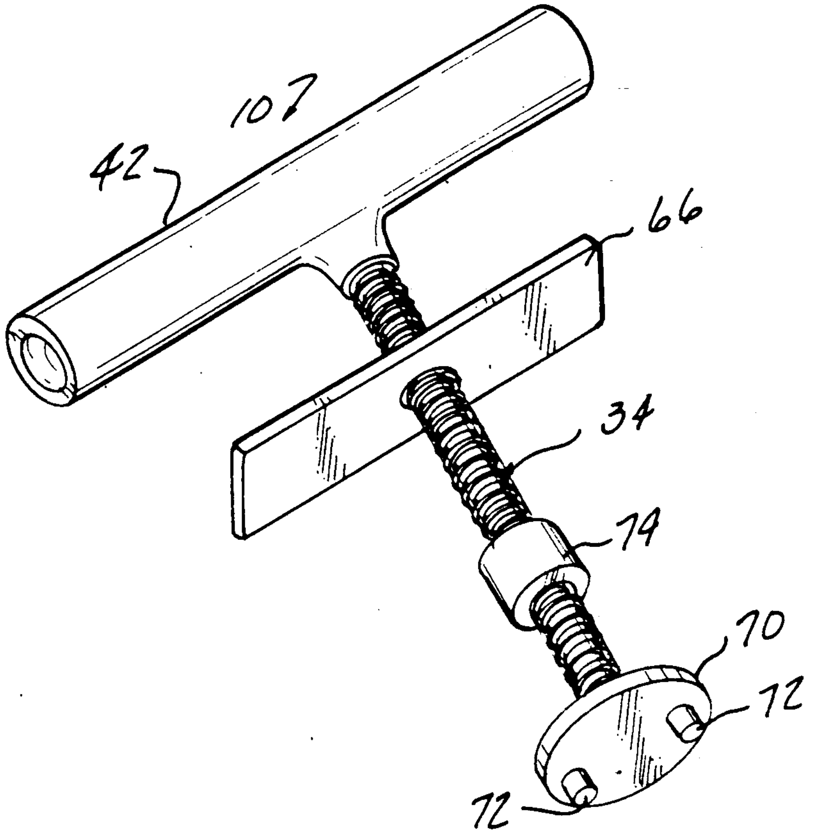
FIG. 3 is a perspective view of a second embodiment of the present invention.
Figure 4:
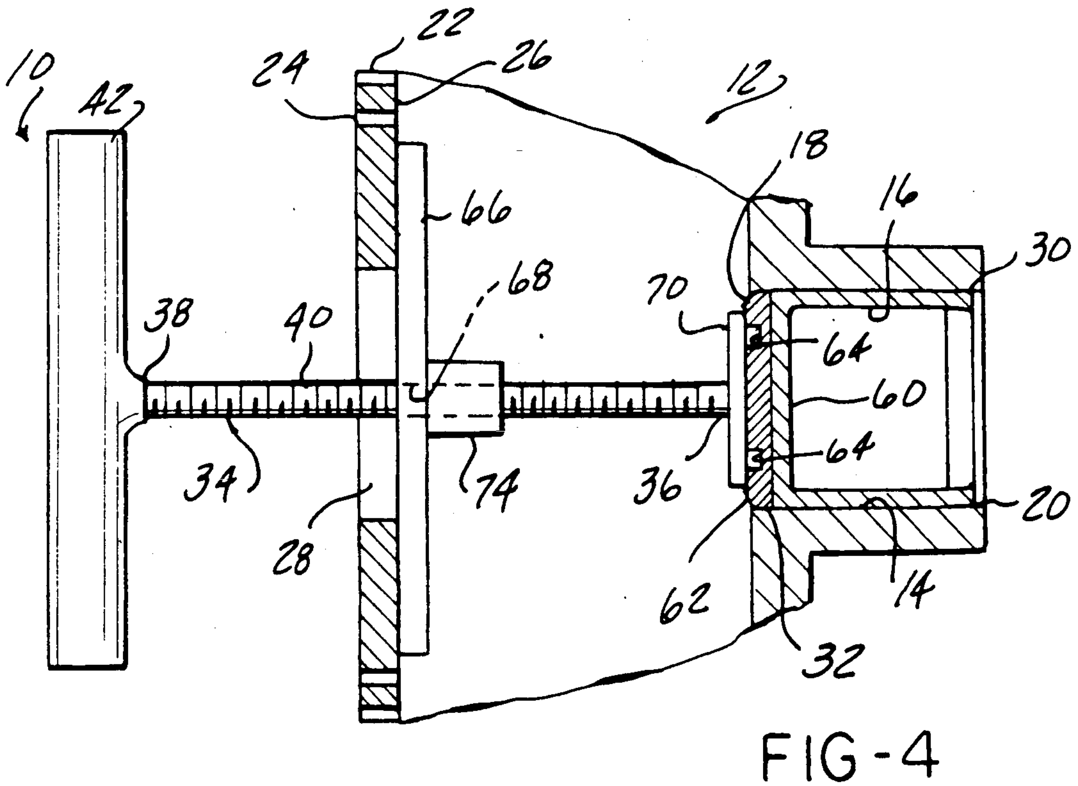
FIG. 4 is a cross sectional view similar to the view of FIG. 2, showing the second embodiment of the invention with the pegs received within the peg receiving bores of the closed piston end and the cylindrical sleeve positioning the first plate against the support bracket axial inner surface.

In both the first and second embodiments, the rotating means may comprise any suitable means. In the preferred embodiments, this rotating means comprises a hollow cylindrical handle 42 as best seen in FIGS. 1 and 3.

In the first embodiment, the axially inner surface abutting means can comprise any suitable means. In the preferred embodiment, this means is a first plate 44, having dimensions larger than the diameter of the opening 28. First plate 44 has a threaded aperture 46 therein which threadingly engages threaded shaft 34. First plate 44 may optionally include a hollow cylindrical threaded foot 48 welded to plate 44 such that the threaded aperture within hollow foot 48 aligns with threaded aperture 46 and first plate 44.

The piston abutting means may comprise any suitable means, but in the preferred embodiment, this means is a second plate 50 having dimensions larger than the diameter of the open end 32 of piston 16. The second plate 50 has an axially inner surface 52 facing the piston 16 and an axially outer surface 54 facing distal end 36 of shaft 34. The piston abutting means further comprises a hollow cylindrical foot 56 having a first end and an open second end, with the first end of foot 56 being attached to the axially outer surface 54 of second plate 50. Tool 10 may be comprised of any suitably rigid material. When this material is steel, foot 56 is attached to second plate 50 by means of welding or any other suitable means.

The distal end 36 of shaft 34 may further comprise a T-shaped section 58 which is removably receivable within the open second end of cylindrical foot 56.

The second embodiment of the present invention is for use with rear disc brake caliper assemblies. In the second embodiment, the second end 32 of piston 16 is closed, and the second end 32 has an axially inner surface 60 and an axially outer surface 62. Axially outer surface 62 has two peg receiving bores 64 therein.

The axially inner surface abutting means of the second embodiment is a first plate 66 having dimensions larger than the diameter of opening 28 in support bracket 22. First plate 66 has a non threaded operture 68 therethrough. Non threaded aperture 68 allows first plate 66 to freely float on threaded shaft 34.

The piston abutting means may comprise any suitable means, but in the preferred embodiment, piston abutting means comprises a second plate 70 having a first surface and a second surface, with the first surface having two pegs 72 attached thereto. Pegs 72 are removably receivable within peg receiving bore 64. The second surface of second plate 70 is attached to distal end 36 of threaded shaft 34.

Piston pushing tool 10 further comprises means, threadingly engaged on the intermediate portion 40 of shaft 34 between the first plate 66 and the second plate 70, for tightening the first plate 66 against the support bracket axial inner surface 26 after pegs 72 have been received within peg receiving bores 64. This allows one to easily position pegs 72 first, while subsequently tightening plate 66 against inner surface 26. The tightening means may comprise any suitable means, but in the preferred embodiment, this means comprises a hollow cylindrical threaded sleeve 74. Tool 10 may optionally comprise a second hollow threaded cylindrical sleeve (not shown) on threaded shaft 34 between handle 42 and first plate 66.

As with the first embodiment, tool 10 may be comprised of any suitably rigid material, including steel and the like.

While preferred embodiments of the invention have been described in detail, it will be apparent to those skilled in the art that the disclosed embodiments may be modified. Therefore, The foregoing description is to be considered exemplary rather than limiting, and the true scope of the invention is that defined in the following claims.

What is claimed is:

1. A piston pushing tool for use in disc brake assemblies having a caliper housing providing a piston receiving bore in which a piston is reciprocably disposed, the bore being open at one end and closed at its opposite end, and an outboard shoe support bracket spaced axially apart from the open end and having axially outer and inner surfaces and an opening therethrough generally aligned with the bore, the piston being a hollow cylindrical piston with a first and adjacent the closed end of the bore, and a second end adjacent the open end of the bore, the second end being closed and having an axially inner surface and an axially outer surface, the axially outer surface having two peg receiving bores therein, the tool comprising:
   - a threaded shaft having a distal end, a proximal end, and an intermediate portion, the shaft being porportioned and designed to extend axially through the opening in the support bracket;
   - means, attached to the proximal end of the shaft, for rotating the shaft;
   - means, engaged on the intermediate portion of the shaft, for abutting the axially inner surface of the support bracket; and
   - a second plate for abutting the second end of the piston, the second plate having a first surface and a second surface, the first surface having two pegs attached thereto, the pegs being removably receivable within the peg receiving bores, the second surface being attached to the distal end of the shaft;
   - wherein upon rotation of the rotating means, the second plate will be driven away from the axially inner surface abutting means, thereby pushing the piston fully into the piston receiving bore.

2. A piston pushing tool for use in disc brake assemblies having a caliper housing providing a piston receiving bore in which a piston is reciprocably disposed, the bore being open at one end and closed at its opposite end, and an outboard shoe support bracket spaced axially apart fromt the open end and having axially outer and inner surfaces and an opening therethrough generally aligned with the bore, the piston being a hollow cylindrical piston with a first end adjacent the closed end of the bore, and a second end adjacent the open end of the bore, the second end being closed and having an axially inner surface and an axially outer surface, the axially outer surface having two peg receiving bores therein, the tool comprising:
   - a threaded shaft having a distal end, a proximal end, and an intermediate portion, the shaft being proportioned and designed to extend axially through the opening in the support bracket;
   - means, attached to the proximal end of the shaft, for rotating the shaft;
   - means, engaged on the intermediate portion of the shaft, for abutting the axially inner surface of the support bracket;
   - means, engaged on the distal end of the shaft, for abutting the second end of the piston;
   - two pegs attached to the piston abutting means; and
   - means, threadingly engaged on the intermediate portion of the shaft between the axially inner surface abutting means and the piston abutting means, for tightening the axially inner surface abutting means against the support bracket axial inner surface after the pegs have been received within the peg receiving bores;

wherein upon rotation of the rotating means, the piston abutting means will be driven away from the axially inner surface abutting means, thereby pushing the piston fully into the piston receiving bore.

3. The piston pushing tool as defined in claim 2 wherein the tightning means comprises a hollow cylindrical sleeve.

4. A piston pushing tool for use in disc brake assemblies having a caliper housing providing a piston receiving bore in which a piston is reciprocably disposed, the bore being open at one end and closed at its opposite end, and an outboard shoe support bracket spaced axially apart from the open end and having axially outer and inner surfaces and an opening therethrough generally aligned with the bore, the piston being a hollow cylindrical piston with a first end adjacent the closed end of the bore, and a second end adjacent the open end of the bore, the second end being closed and having an axially inner surface and an axially outer surface, the axially outer surface having two peg receiving bores therein, the tool comprising:

a threaded shaft having a distal end, a proximal end, and an intermediate portion, the shaft being proportioned and designed to extend axially through the opening in the support bracket;

a handle, attached to the proximal end of the shaft, for rotating the shaft;

a first plate engaged on the intermediate portion of the shaft, for abutting the axially inner surface of the support bracket, the first plate having dimensions larger than the diameter of the opening in the support bracket;

a second plate for abutting the second end of the piston, the second plate having a first surface and a second surface, the first surface having two pegs attached thereto, the pegs being removably receivable within the peg receiving bores, the second surface being attached to the distal end of the shaft; and a hollow cylindrical sleeve, threadingly engaged on the intermediate portion of the shaft between the first plate and the second plate, for tightening the first plate against the support bracket axial inner surface after the pegs have been received within the peg receiving bores;

wherein upon rotation of the handle, the second plate will be driven away from the first plate, thereby pushing the piston fully into the piston receiving bore.

* * * * *